US008711036B2

(12) United States Patent
Gaal et al.

(10) Patent No.: US 8,711,036 B2
(45) Date of Patent: Apr. 29, 2014

(54) SYSTEM AND METHOD TO OBTAIN SIGNAL ACQUISITION ASSISTANCE DATA

(75) Inventors: Peter Gaal, San Diego, CA (US); Leonid Sheynblat, Hillsborough, CA (US); Christopher Patrick, San Diego, CA (US); Wyatt Thomas Riley, Wayne, PA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 13/214,062

(22) Filed: Aug. 19, 2011

(65) Prior Publication Data

US 2012/0038510 A1    Feb. 16, 2012

Related U.S. Application Data

(62) Division of application No. 10/554,629, filed as application No. PCT/US2004/010305 on Apr. 2, 2004, now Pat. No. 8,031,113.

(60) Provisional application No. 60/465,371, filed on Apr. 25, 2003, provisional application No. 60/467,258, filed on Apr. 30, 2003.

(51) Int. Cl.
*G01S 19/25* (2010.01)

(52) U.S. Cl.
CPC ..................................... *G01S 19/25* (2013.01)
USPC ..................................................... 342/357.64

(58) Field of Classification Search
CPC ....................................................... G01S 19/25
USPC ........................... 342/357.64, 357.69, 357.58
See application file for complete search history.

(56) References Cited

U.S. PATENT DOCUMENTS 5,418,538 A * 5/1995 Lau ........................... 342/357.75
5,550,551 A    8/1996 Alesio
5,666,122 A    9/1997 Carter
(Continued)

FOREIGN PATENT DOCUMENTS

EP    0541026 A2    5/1993
EP    1045609 A1    10/2000
(Continued)

OTHER PUBLICATIONS

European Search Report—EP10002970, Search Authority—Munich Patent Office, Oct. 13, 2010.
(Continued)

*Primary Examiner* — Gregory C Issing
(74) *Attorney, Agent, or Firm* — Thien T. Nguyen

(57) ABSTRACT

Signal acquisition assistance data is obtained for receiving devices such as wireless position assisted location devices seeking signals from any source, such as satellite vehicles and base stations. The data may be obtained from previously acquired data, based upon evaluation of changes in parameters such as time and location that may jeopardize validity. In some cases the data may be adjusted for the changes in parameters. Refined data may be calculated by a receiver using partial measurements of signal sets, particularly if the acquisition assistance data provided by a remote entity includes more distinct parameters than have typically been provided. New data need not be obtained until the validity of previous data expires due to limitations upon temporal extrapolation using Doppler coefficients, unless mobile station movement that cannot be compensated is detected, and jeopardizes validity of the previous data.

27 Claims, 3 Drawing Sheets

(56) References Cited

U.S. PATENT DOCUMENTS

| | | | |
|---|---|---|---|
| 5,905,950 A | 5/1999 | Anell | |
| 5,999,125 A | 12/1999 | Kurby | |
| 6,114,992 A * | 9/2000 | Underbrink | 342/357.67 |
| 6,133,874 A | 10/2000 | Krasner | |
| 6,188,351 B1 | 2/2001 | Bloebaum | |
| 6,211,819 B1 * | 4/2001 | King et al. | 342/357.66 |
| 6,353,412 B1 | 3/2002 | Soliman | |
| 6,373,431 B1 | 4/2002 | Nakajima | |
| 6,400,319 B1 | 6/2002 | Castelloe et al. | |
| 6,415,154 B1 | 7/2002 | Wang et al. | |
| 6,429,815 B1 * | 8/2002 | Soliman | 342/357.64 |
| 6,433,735 B1 | 8/2002 | Bloebaum et al. | |
| 6,438,382 B1 | 8/2002 | Boesch et al. | |
| 6,757,610 B1 | 6/2004 | Mann et al. | |
| 6,839,020 B2 * | 1/2005 | Geier et al. | 342/357.64 |
| 6,856,282 B2 | 2/2005 | Mauro et al. | |
| 6,873,910 B2 * | 3/2005 | Rowitch et al. | 701/469 |
| 6,937,865 B1 * | 8/2005 | Bloebaum et al. | 455/456.1 |
| 6,958,726 B1 | 10/2005 | Abraham et al. | |
| 7,009,948 B1 * | 3/2006 | Carlsson et al. | 370/329 |
| 7,181,214 B1 | 2/2007 | White | |
| 7,197,306 B1 | 3/2007 | Song | |
| 7,254,402 B2 | 8/2007 | Vayanos et al. | |
| 7,266,378 B2 | 9/2007 | Norta et al. | |
| 7,359,706 B2 | 4/2008 | Zhao | |
| 7,463,195 B2 | 12/2008 | Rabinowitz et al. | |
| 7,577,448 B2 | 8/2009 | Pande et al. | |
| 8,031,113 B2 | 10/2011 | Gaal et al. | |
| 8,432,312 B2 | 4/2013 | Gaal et al. | |
| 2003/0040331 A1 * | 2/2003 | Zhao | 455/552 |
| 2003/0045302 A1 | 3/2003 | Oda et al. | |
| 2004/0048597 A1 | 3/2004 | Khushu et al. | |
| 2004/0053626 A1 | 3/2004 | Yagi | |
| 2012/0040668 A1 | 2/2012 | Gaal et al. | |
| 2012/0040689 A1 | 2/2012 | Gaal et al. | |

FOREIGN PATENT DOCUMENTS

| | | |
|---|---|---|
| JP | S62163987 A | 7/1987 |
| JP | 200174826 | 3/2001 |
| JP | 2001249174 | 9/2001 |
| JP | 2002303665 | 10/2002 |
| JP | 2002305762 A | 10/2002 |
| JP | 2002532724 | 10/2002 |
| RU | 2092902 C1 | 10/1997 |
| WO | WO9848294 | 10/1998 |
| WO | 0036431 | 6/2000 |
| WO | WO0223216 A1 | 3/2002 |
| WO | WO0231526 | 4/2002 |

OTHER PUBLICATIONS

International Search Report, PCT/US2004/010305, International Searching Authority, United States, Mar. 21, 2005.
Supplementary European Search Report—EP04760228—European Search Authority—Munich—Aug. 5, 2009.
Written Opinion—PCT/US2004/010305, International Search Authority, European Patent Office, Mar. 21, 2005.
European Search Report—EP11009654—Search Authority—Munich—Feb. 1, 2012.
Supplementary Partial European Search Report—EP04760228—Search Authority—Munich—Feb. 1, 2012.
European Search Report—EP12006021—Search Authority—Hague—May 28, 2013.

* cited by examiner

SYSTEM AND METHOD TO OBTAIN SIGNAL ACQUISITION ASSISTANCE DATA

CROSS-REFERENCES TO RELATED APPLICATIONS

This application is a divisional application of application Ser. No. 10/554,629, filed Apr. 12, 2007, entitled SYSTEM AND METHOD TO OBTAIN SIGNAL ACQUISITION ASSISTANCE DATA, which is the National Stage of International Application No. PCT/US04/10305, filed Apr. 2, 2004 which claims priority to U.S. Provisional Application No. 60/465,371 filed Apr. 25, 2003 and U.S. Provisional Application No. 60/467,258, filed Apr. 30, 2003. The entire disclosures of all these applications (including all attached documents) are incorporated by reference in their entireties for all purposes.

BACKGROUND

1. Field

The disclosed method and apparatus relates to wireless communications, and more specifically to wireless systems that employ signal acquisition assistance data to assist a receiving station in acquiring selected signals.

2. Related Art

The wireless communications industry is developing services that generate accurate position information for wireless terminals. This development is partly motivated by the needs of public safety service providers in their efforts to promptly respond to emergency calls. In many instances, the calling party may be unwilling or unable to provide accurate position information. When such information is provided automatically, public safety officials are able to respond and render service quickly. In general, a location at which a public safety entity receives emergency '911' telephone calls is known as the Public Safety Answering Point (hereinafter 'PSAP').

The well-known Global Positioning System (GPS) offers one possible approach to providing wireless terminal position determination. Using GPS technology, wireless terminal position and velocity information can be determined within the accuracy requirements required by the FCC report and order. In addition to providing sufficiently accurate wireless terminal position information, new GPS features are easily integrated into a wireless telephone once GPS technology is added to the unit. The extra value features can be used to increase the market value of the wireless phone and to enhance revenues through the provision of additional services to the end users of such telephones.

As is well known, the GPS navigation system employs satellites that are in orbit around the earth. Any user of GPS, anywhere on earth, can derive precise navigation information including 3-dimensional position, velocity and time of day. The GPS system includes 24 satellites that are deployed in circular orbits with radii of 26,600 kilometers in three planes inclined at 55° with respect to the equator and spaced 120° with respect to one another. Eight satellites are equally spaced within each of the three orbit paths. Position measurements using GPS are based on measurements of propagation delay times of GPS signals broadcast from the orbiting satellites to a GPS receiver. Normally, reception of signals from 4 satellites is required for precise position determination in 4 dimensions (latitude, longitude, altitude, and time). After a receiver measures respective signal propagation delays, a range to each satellite is calculated by multiplying each delay by the speed of light. The location and time are found by solving a set of four equations with four unknowns incorporating the measured ranges and the known locations of the satellites. The precise capabilities of the GPS system are maintained using on-board atomic clocks for each satellite, in conjunction with tracking stations that continuously monitor and correct satellite clock and orbit parameters.

Each GPS satellite vehicle (SV) transmits two direct-sequence-coded spread spectrum signals in the L-band: an L1 signal at a carrier frequency of 1.57542 GHz, and an L2 signal at 1.2276 GHz. The L1 signal consists of two phase-shift keyed (PSK) spread spectrum signals modulated in phase quadrature: the P-code signal (P for "precise"), and the C/A-code signal (C/A for "coarse/acquisition"). The L2 signal contains only the P-code signal. The P and C/A codes are repetitive pseudo-random (also called pseudo-noise or "PN") sequences of bits (termed "chips" by those skilled in the telecommunication arts) that are modulated onto the carriers. The clock-like nature of these codes is utilized by the receiver in making time delay measurements. The PN codes for each SV are unique, allowing the receiver to distinguish which satellite transmits a given code, even though they are all transmitted at the same carrier frequency. A 50 bit/sec data stream containing system status information and satellite orbit parameters, useful for the navigation calculations, are also modulated onto each carrier. The P-code signals are encrypted, and are not generally available for commercial and private users. The C/A signal is available to all users.

The operations performed by GPS receivers are, for the most part, typical of those performed by direct-sequence spread spectrum receivers. The spreading effect of the PN code modulation must be removed from each signal by multiplying it by a time-aligned, locally generated copy of the code, in a process known as "despreading." Because the appropriate time alignment, or code delay, is unlikely to be known at receiver start-up, it must be determined by searching during the initial "acquisition" phase of GPS receiver operation.

After despreading is performed, each signal consists of a 50 bit/sec PSK signal at an intermediate carrier frequency. The exact frequency of this PSK signal is uncertain due to the Doppler effect caused by relative movement between the satellite and the terminal unit, and due to local receiver GPS clock reference errors. A search for the Doppler frequency must be performed during initial signal acquisition, because it is usually unknown prior to signal acquisition. Carrier demodulation can proceed once the Doppler frequency is approximately determined.

After performing carrier demodulation, data bit timing is derived using a bit synchronization loop, and the data stream is finally detected. A navigation calculation may be undertaken once the signals from four satellites have been acquired and locked onto, the time delay and Doppler measurements have been made, and a sufficient number of data bits (enough to determine the GPS timing reference and orbit parameters) are received.

One disadvantage of the GPS system for location determination is the relatively long time needed to perform signal acquisition. As noted above, SV signals cannot be tracked until they have first been located by searching in a two-dimensional search "space", whose dimensions are code-phase delay and Doppler frequency shift. Typically, if there is no prior knowledge of a signal's location within this search space, as would be the case after a receiver "cold start", a large number of code delays (about 2000) and Doppler frequencies (about 15) must be searched for each SV signal that is to be acquired and tracked. Thus, for each signal, up to 30,000 locations in the search space must be examined. Typically these locations are examined sequentially, one at a time, a process that can take as long as 5 to 10 minutes. The acquisition time is further lengthened if the identities (i.e., PN-codes) of the four satellites within view of the receiving antenna are unknown.

Signal acquisition is needed at least when a GPS receiver has lost the signals, which may occur, for example, after power down, or when the signal has been blocked from the receiver for some period of time. After acquiring the signals, they may be maintained or "tracked."

However, many devices such as cellular telephone mobile stations (MSs) possess GPS functionality as an additional feature or enhancement, rather than as a primary purpose of the device. For these devices, a need to continuously track GPS SV signals would increase the cost, decrease the battery life, or reduce the functionality of the primary device (e.g., primarily functioning as a cell phone). For example, because GPS SV signals are provided at frequencies that differ from cellular telephone signal frequencies, a single receiver cannot simultaneously monitor both frequencies. In order to do so, an MS would need an additional receiver unit, thereby adding to the cost of the device. Moreover, the processing capability of the system would need to be increased in order to concurrently monitor both signals, which would increase both cost and power consumption. Accordingly, many such systems rarely track GPS SV signals, but rather acquire the needed signals only upon demand.

All GPS-capable systems require acquisition of GPS SV signals. Some systems only occasionally require such acquisition, while others require acquisition of the GPS SV signals each time they are needed for a GPS function. The need for signal acquisition, unfortunately, does not prevent GPS functions from being needed urgently, such as when an MS location is required quickly to facilitate response to an emergency. In such situations, the time delay associated with a 5 to 10 minute GPS satellite signal acquisition cold-start by a GPS/wireless terminal unit before a position determination can be obtained is highly undesirable.

In order to reduce this delay, information may be provided to aid a receiver in acquiring a particular signal. Such acquisition assistance information permits a receiver to narrow the space that must be searched in order to locate a signal, by providing a "code window." The code window provides a reduced range within which the "code phase" (effectively, the signal time of arrival) should be found, or a predicted range of Doppler shift associated with the signal. Acquisition assistance may also include other information about the signal, such as its PN (pseudo-noise or pseudo-random) code, frequency, modulation, and content. The narrower the windows on the uncertainties of the signal are, the more quickly the receiver can acquire the signal. Narrowing these windows not only enables faster acquisition of signals, which shortens the delay before a location determination can be produced, but also reduces the processing burden on the receiver, which may reduce power consumption. Systems in which receivers locate ranging signals for position location (such as SV GPS signals) upon demand, with the assistance of information provided from another source within the system, are generally referred to as "wireless assisted position location" systems.

Since their introduction, wireless assisted position location systems have been gaining popularity as the preferred position location technology. They are applicable in any system where user terminals capable of measuring ranging signals from given signal sources can access a data base in order to obtain information facilitating quick acquisition of the ranging signals. Among others, one of the applications is use by position location capable wireless mobile stations (MSs) communicating with one or more base stations (BSs), where the BSs are connected to one or more data base servers, also called Position Determination Entities (PDEs), which can provide signal acquisition assistance data.

Signal acquisition assistance information transmitted to an MS may include description of the type of ranging signals available to the MS and characterization of those signals, such as frequency, PN offset, expected code phase, etc. Determination of some of these parameters is based on an approximate knowledge of the location and the internal state of the MS. A goal of such acquisition assistance information is to permit the MS to predict the time of arrival, or code phase, of a particular SV signal, and the Doppler shift of the SV signal if applicable, which may be referred to generally as code phase prediction. Considerations include the generation, conveyance, and use of code phase prediction information.

Code phase prediction is only as accurate as the parameters input for its calculation. Because the clock offset, position and movement of an MS relative to a source of a particular signal that is desired are generally not precisely known, the predicted code phase has some uncertainty, which can be expressed as an uncertainty window around a predicted code phase and an uncertainty window around a predicted Doppler shift of the signal.

Wireless assisted position location systems suffer from a drawback of latency due to their need to receive acquisition assistance information when, for instance, GPS functions are required. The latency is due not only to the time required to acquire the requisite signals, but also the time required to request acquisition assistance information, generally from another entity within the telecommunications system, for that entity to collect and provide the acquisition assistance, and for the acquisition assistance to be received. Moreover, communicating the acquisition assistance information burdens the communication system carrying capacity.

Therefore, a need exists for a system and method that enable accurate code phase prediction using acquisition assistance, while reducing processing and communications burdens on receivers in wireless assisted position location systems.

SUMMARY

The system and method described herein includes features for conveying acquisition assistance information to a user terminal, and for determining acquisition assistance parameters in a network infrastructure and in the user terminal Various aspects of the described system and method address the need identified above for enabling accurate code phase prediction using acquisition assistance, while reducing processing and communications burdens on receivers in wireless assisted position location systems. The skilled person will understand that various aspects of the described system and method also provide other advantages.

One aspect includes a method by which a mobile station (MS) in a cellular telecommunications system avoids a need to receive acquisition assistance information, when attempting to acquire a given signal, by determining that previously received acquisition information is still valid for use by the MS in acquiring the given signal.

Another aspect includes a method by which acquisition assistance may be utilized to acquire a plurality of signals. A first signal of the plurality may be acquired, and measurements of the first signal may be employed to improve the acquisition assistance data associated with other signals in the plurality sought.

Yet another aspect includes a method of acquiring a signal at a mobile station (MS). The method includes obtaining acquisition assistance when the MS is at a first location, and then compensating the obtained acquisition assistance data in accordance with the MS moving to a different new location.

An additional aspect includes a method of determining changes to an MS location in a cellular telecommunications system. The method utilizes a list of base stations (BSs) meeting selection criteria that are relevant to a location of the MS. The method includes a step of comparing BSs belonging to such a list at one time with BSs belonging to the "same" list (i.e., the list of BSs meeting the same selection criteria) at a later time.

BRIEF DESCRIPTION OF THE DRAWINGS

Embodiments of the disclosed method and apparatus are shown in the following figures, in which like reference numbers and designations indicate like or similar parts.

DETAILED DESCRIPTION

Figure 1:
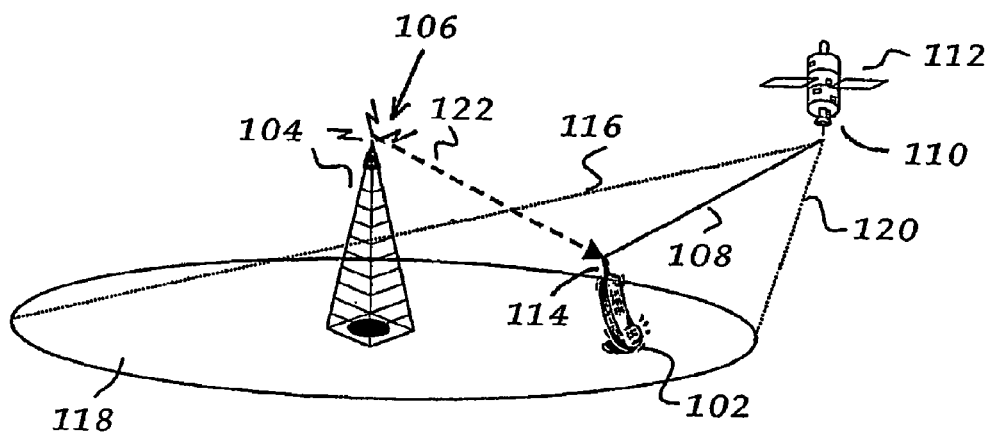
FIG. 1 illustrates typical basic geometry for a mobile station, a serving base station, and a satellite vehicle whose signal is to be acquired.

The system and method described herein is applicable for systems, such as wireless assisted position location systems, that utilize acquisition assistance data to aid a receiver in acquiring a signal. Most wireless assisted position location systems are able to acquire and utilize global positioning system (GPS) satellite vehicle (SV) signals. Present GPS SV signals, as described above, transmit signals having a format that is closely related to CDMA telecommunications signals. Accordingly, an exemplary system described herein is based upon a CDMA cellular telecommunications system. However, it will be understood by those skilled in the art that any other communication air interface may be used as well.

For both signal acquisition and ranging purposes, information related to the timing of selected communication signals is useful. It is useful to ascertain when to expect the arrival of a recognizable feature of a given signal so that a search for the signal need only cover a limited time duration, and it is also useful to determine, as exactly as possible, the time of arrival of various signals with respect to each other. This latter information can be used for ranging purposes as is described below. Both of these timing issues involve "time of arrival" of a recognizable feature of a signal.

Persons skilled in regard to communication systems will understand that such time of arrival information is in most ways equivalent to a "code phase" of the signal. The "code phase" describes the timing of the arrived signal in terms of the phase offset between the received code and the same code beginning at a reference time. Thus, identifying the "code phase" of a signal effectively identifies the "time of arrival" of the signal, requiring only multiplication of the code phase by the frequency of the signal to obtain a time of arrival. These two are so closely and simply related that "time of arrival" is nearly interchangeable with "code phase." "Time of arrival" terminology is often used in position determining systems, particularly in systems that do not share the "code" aspects of communication systems.

The system and method described herein may be readily employed by all wireless systems. Signals that need to be acquired for ranging purposes are not limited to CDMA signals, but may include many other types. Ranging signals are also not limited to GPS SV signals. For example, base station (BS) signals are commonly used for ranging, and the ranging signals need not be communication. Nonetheless, an exemplary system described herein is a CDMA communication system, and "code phase" is more commonly used in regard to such systems. The skilled person will understand the related nature of these terms, and will have no difficulty employing concepts that are described using one of these terms in a system in which the other term is more often applied.

The following notations may be used throughout this description:

R is the radius of the MS location uncertainty region
$b_{SV}$ is the SV clock bias
$\hat{b}_{BS}$ is the estimated BS clock bias
$\tilde{b}_{BS}$ is the BS clock bias uncertainty
$b_{MS}$ is the MS clock bias
$\hat{b}_{MS}$ is the estimated MS clock bias
$\tilde{b}_{MS}$ is the MS clock bias uncertainty
$\hat{d}_{MS}$ is the estimated time delay difference between the GPS and CDMA receive chain of the MS
$\tilde{b}_{MS}$ is the uncertainty in the estimated time delay difference between the GPS and CDMA receive chains of the MS
$\Delta \hat{f}_{MS}$ is the estimated MS frequency offset
$\Delta \tilde{f}_{MS}$ is the uncertainty in the estimated MS frequency offset
$f_{SV}$ is the SV Doppler
$\alpha$ is the SV elevation angle
c is the speed of light
$f_c$ is the chip rate (f=1.023 MHz for GPS C/A code)
$\bar{r}_{BS\_MS}$ is the vector pointing from the BS to the MS
$\bar{r}_{BS\_SV}$ is the vector pointing from the BS to the SV
$\bar{r}_{MS\_SV}$ is the vector pointing from the MS to the SV In current systems, acquisition assistance data for Global Positioning System (GPS) Space Vehicle (SV) signals are provided to the mobile station (MS). The exact procedures for providing this acquisition assistance data are defined in the various position location signaling standards such as, for example, TIA/EIA IS-801-1. At least some of these standards fail to provide methods for conveying similar acquisition assistance information pertaining to the cellular BSs. As is well known, signals other than GPS SV signals, for example cellular BS pilot signals, can also be used as ranging signal sources. To date, this deficiency has not been viewed as serious. This is because BS acquisition assistance information is typically provided to the MS via other wireless signaling methods, for example, in the form of a Neighbor List Message in TIA/EIA IS-2000. Such acquisition assistance, however, is tailored to facilitate seamless handoff in the wireless network, not to facilitate position location measurements. While the existing acquisition assistance techniques accordingly provide less than optimal performance, their effectiveness may be improved by adding explicit BS acquisition assistance in the position location messages. Further additional explicit acquisition assistance in position location messages also facilitates implementation of other improvements to wireless assisted position location systems.

Assisting Acquisition of Signal Doppler Shift

The following relatively simple method may be used to provide signal acquisition assistance. Because the predicted Doppler frequency does not need to be known with great precision by the MS, a search for a Doppler frequency offset of an SV signal can be narrowed using the following method.

The predicted Doppler, $\hat{D}$, can be derived as $$\hat{D} = f_{SV} - \Delta \hat{f}_{MS}, \quad (1)$$

and the Doppler search window, $W_D$, can be calculated as $$W_D = R \cdot q_1 + \Delta \tilde{f}_{MS}, \quad (2)$$

where $q_1$ is a factor accounting for the location uncertainty. Typically, $q_1 = 10^{-3}$ Hz/m is used.

Simple Code Phase Assistance Method

FIG. 1 illustrates an MS 102 communicating with a serving BS (or base transmitting station BTS) 104. The MS communication with the BS 104 implies that the MS 102 is located in the coverage area of the BS 104. If the serving antenna 106 operates directly from the serving base station as shown, (for example, there is no repeater in the communication path), then an appropriate first estimation of the coverage area of the BS 104 is a circle centered at the BS antenna 106. This coverage area, in turn, coincides with an uncertainty area for the location of the MS 102. In that case, a code phase prediction (i.e., a code phase window center) and code phase prediction uncertainty (i.e., a code phase window size) for a signal 108 between an antenna 110 of a SV 112 and an antenna 114 of the MS 102 can be readily determined by means of geometry, using any appropriate calculation techniques such as those set forth in U.S. Pat. No. 6,429,815. The maximum code phase 116 corresponds to the distance from the SV 112 to a farthest point of a serving cell 118, while a minimum code phase 120 corresponds to a closest point of the serving cell 118 to the SV 112.

The MS observes code phase P, which can be expressed as $$P = f_c \cdot \left( \frac{|\vec{r}_{MS\_SV}|}{c} + b_{SV} - b_{MS} \right). \quad (3)$$

The predicted code phase, $\hat{P}$, can be expressed as $$\hat{P} = f_c \cdot \left( \frac{|\vec{r}_{BS\_SV}|}{c} + b_{SV} - \hat{b}_{MS} \right), \quad (4)$$

and the window size, W, can be expressed as $$W = f_c \cdot \left( \frac{2 \cdot R \cdot \cos \alpha}{c} + \tilde{b}_{MS} \right). \quad (5)$$

The computed code phase prediction parameters, $\hat{P}$ and W, may be transmitted to the MS from the BS using existing message formats for cellular communication signaling. Note that the line in FIG. 1 illustrating the actual code phase 108 corresponds to $\vec{r}_{MS\_SV}$. A line 122, indicating a signal (assistance) from the BS antenna 106 to the MS antenna 114, also indicates the range vector $\vec{r}_{BS\_MS}$. $\vec{r}_{BS\_SV}$ is the vector from the BS antenna 106 to the SV antenna 110, which is not illustrated with a corresponding line in FIG. 1.

This simple method works well as long as the clock offset (clock bias) in the MS and the SV are known. The SV clock offset (bias) can be determined from the Ephemeris parameters available to the Position Determination Entity (PDE) of the wireless system (not shown in FIG. 1). The MS clock offset (bias) may also be available, for example if it was stored after being computed during a previous successful position location measurement. However, the previously determined MS clock offset may not still be valid. Having determined that the MS clock offset (bias) is available, it may be tested for validity by comparing the time since the data was obtained with information about the clock frequency error. If stored data indicates that the clock frequency error is negligible, or if accurate information permits the frequency error to be compensated, then the MS clock offset value (as compensated) may be assumed to be valid. If the MS clock offset is not reliably known, then the code phase window W should be extended by an additional non-zero margin, $\tilde{b}_{MS}$ (MS clock bias uncertainty), as shown in Equation (5). According to the existing message format in CDMA standard use, a single value would be transmitted from the PDE to the MS, representing the total search window size.

Extended Code Phase Assistance Method

Wireless systems, such as IS-95, IS-2000 or IS-856, in which the BSs are synchronized to GPS time, offer the advantage of having the MSs also approximately synchronized to GPS time. In these cases, the MS clock bias will be primarily due to the BS system time offset in combination with the BS-to-MS signal propagation delay. The code phase P observed by the MS can be expressed as follows:

$$P = f_c \cdot \left( \frac{|\vec{r}_{MS\_SV}|}{c} + b_{SV} - \hat{b}_{MS} \right) \quad (6)$$

$$= f_c \cdot \left( \frac{|\vec{r}_{MS\_SV}|}{c} + b_{SV} - \hat{b}_{BS} - \frac{|\vec{r}_{BS\_MS}|}{c} - \hat{d}_{MS} \right).$$

A code phase assistance parameter set that can be used to produce a minimal code phase window size for a given set of available data is desirable, and can be obtained as follows. For every point in the MS location uncertainty area, compute the value P according to Equation (6), and determine the minimum and maximum of those values, denoted by $\hat{P}_{min}$ and $\hat{P}_{max}$ over all points in the uncertainty area. Then the code phase assistance parameters can be computed as $$P = \frac{\hat{P}_{min} + \hat{P}_{max}}{2}, \quad (7)$$

and $$W = \hat{P}_{max} - \hat{P}_{min} + f_c \cdot (\tilde{b}_{BS} + \tilde{d}_{MS}). \quad (8)$$

Note that W computed according to Equation (8) already accounts for a component of the MS clock bias uncertainty that is due to the BS-to-MS signal propagation delay. Accordingly, the additional margins $\tilde{b}_{BS}$ and $\tilde{d}_{MS}$ need only account for uncertainty in hardware delays of the BS and MS. For a well-calibrated MS, $\tilde{d}_{MS}$ may often be considered to be zero. Uncertainty in the SV clock bias is also typically small, and for many purposes may be considered to be zero.

Producing an optimized acquisition assistance parameter set by searching for the maximum and minimum over all points in the uncertainty area is computationally inconvenient, but simplifications may be used with little loss of accuracy. For example, although P is a continuous function of the MS position, a practical search is limited to finite step size by factors such as chip length and sampling resolution. Accordingly, the search may be restricted to points of a grid in which neighboring grid points are separated by $$\frac{c}{q_2 \cdot f_c},$$

where $q_2$ is an appropriately chosen constant, for example, $q_2=4$. Another approach to reducing the computational burden is to employ an iterative search algorithm, such as Newton iterations.

The search space can be reduced by considering the following observation. It can be shown that the minimal and maximal values, $\hat{P}_{min}$ and $\hat{P}_{max}$ will occur somewhere on the perimeter of the MS location uncertainty region. Accordingly, a search for the external values may be expedited by restricting the search to the perimeter. Note that, in general, the uncertainty region is a 3-D object, and thus the search should be conducted over a 'surface'.

Graphic understanding of one manner in which the foregoing method may be used to reduce the calculated code phase window size may be gained by considering an extreme case. The vectors $\bar{r}_{BS\_MS}$ and $\bar{r}_{BS\_SV}$ are parallel, but pointing in opposite directions, when the SV can be "seen" behind the BS by looking from the MS location (typically involving a low elevation SV). The code phase uncertainty is essentially zero along a line defined by this geometry. This is so because the code phase from the MS to the BS, and from the MS to the SV, must vary exactly in tandem. As the MS moves farther away from the BS, the MS clock bias increases by the added delay. This change in the MS clock is precisely equal to the increase in actual code phase of the SV signal, canceling it out from the standpoint of the MS. Examining the latter portion of Equation 6, the two vector quantities add together geometrically to a constant, and the remaining quantities are constant or insignificant. Thus, the observed code phase, P, is independent of the MS-to-SV distance. In other words, the code phase window W can be reduced to zero, even though neither the MS location uncertainty nor the MS clock bias uncertainty are zero.

Although W is reduced to zero only along a line extending from the BS antenna directly away from the SV whose signal is sought, the principle yields a reduction in W for all MS locations except those positioned along a line between the BS and the SV. Accordingly, the enhanced code phase assistance method is preferable to the simple method described previously because, in general, it gives smaller search window sizes. Note that this technique may be extended to another BS, other than the serving BS (which determines the MS clock bias), if such other BS happens to be substantially in line with a SV whose signal is sought. For this purpose, measurement of the pilot of such other BS provides a measurement that may be used to offset the MS clock bias. Effectively, the other BS may be used as a clock source for purposes of the particular SV acquisition.

Improving Estimates with Partial Measurements

In practical systems, acquisition of a number of SV signals is sought concurrently. However, measurements for all desired SV signals are not usually attempted simultaneously because of finite hardware resources. Even if searches for multiple signals were simultaneously initiated, some SVs would be found earlier than others because their position in the code phase window is scheduled for search earlier, or because they require shorter integration time, or both. This fact may be exploited, when seeking to acquire a plurality of signals, by progressively tightening search windows for as-yet unacquired signals on the basis of measurements of one or more signals that have already been acquired as a consequence of the search.

A good approximation of the MS clock bias may be reached after taking a single SV measurement, if the SV is approximately at $\alpha=90°$ elevation angle, and the altitude of the MS and the BS are known. Note that the altitude of the BS (more precisely the altitude of the BS antenna) is typically known, and the altitude of the MS can be well approximated from altitude aiding assistance data. An overhead satellite is also likely to have a relatively strong signal that is readily distinguished by the MS, and accordingly it may be useful to endeavor acquiring the signal from such a SV first when a group of SV signals is sought.

When the SV is approximately at $\alpha=90°$ elevation angle, we have $$|\bar{r}_{MS\_SV}|-\bar{r}_{BS\_SV}\approx\hat{h}_{MS}-h_{MS}, \quad (9)$$

where $h_{MS}$ is the altitude of the MS and $\hat{h}_{MS}$ is the estimated altitude of the MS. (Note that in $\bar{r}_{BS\_SV}$, the altitude of the BS is adjusted to be the same as the estimated altitude of the MS.) Assume also that the BS uses Equation (4), with $\hat{b}_{MS}=0$, in computing $\hat{P}$. Then, from Equations (3), (4) and (9), the true MS clock bias $b_{MS}$, can be computed as $$b_{MS} = \frac{\hat{P}-P}{f_c} + \frac{h_{BS}-h_{MS}}{c}. \quad (10)$$

Once the MS clock bias is determined, the additional margin, $f_c \cdot \tilde{b}_{MS}$, that was previously included in W, can be removed, or at least reduced, as long as the MS clock bias uncertainty value is explicitly known. Accordingly, the search time for the remaining SV signals can be reduced. In order to effect such progressive reduction in W at the MS, the margin $\tilde{b}_{MS}$ should be transmitted from the PDE to the MS as a separate value, rather than folded into the total search window size as suggested by Equation (5). This requires a small change to the existing message formats as presently specified by current standards.

Progressively reducing the search windows at the MS, based on partial SV measurements, works best if the clock bias estimate $\hat{b}_{MS}$ used by the PDE is also available to the MS. In the above example, this was achieved by setting $\hat{b}_{MS}=0$. Transmitting the value of $\hat{b}_{MS}$ explicitly to the MS is a good solution for arbitrary $\hat{b}_{MS}$ values, but requires another small change to the existing signaling message.

Thus, partial acquisition of a list of signals may be used to reduce the MS clock uncertainty component of a code phase estimate or uncertainty window. This may be particularly useful, on the one hand, if the data available to the computing entity (such as the MS) explicitly includes the MS clock uncertainty component, and when the already-acquired signal from the search list is from a SV that is nearly directly overhead. On the other hand, geometric considerations may substantially reduce W for SV signals transmitted by SVs that are at low elevations when the MS and the SV are on opposite sides of a BS received by the MS. As noted previously, any measurable BS may be used for this purpose if the MS calculations are adjusted to be as if based upon such measurable BS's pilot signal. In addition to these techniques, other appropriate navigational techniques may be employed with partial measurements to improve acquisition assistance for subsequent signal acquisitions.

Minimizing Code Phase Window Size Additional Acquisition Information Elements

A MS may be programmed to compute predicted code phase parameters, rather than to merely receive them via a BS from another entity in the system such as a PDE. For this purpose, the acquisition assistance provided to the MS may advantageously include information elements describing the geometry of the BS and SV constellation relative to an estimated location of the MS. Some of these information elements are not included in BS-to-MS acquisition assistance messages specified by at least some current standards. Transmitting such additional data may be at least partially offset by omitting explicit code phase search window size and Doppler search window size information as part of the assistance data, such that the net effect on signaling overhead will be minor.

Useful information elements that are not included in some cellular telecommunications acquisition assistance standards fall into several categories. Any combination of the information elements set forth below may be used in a particular implementation, according to ordinary engineering considerations, in order to help reduce calculated code phase window sizes. A first such category is labeled "SV signal acquisition assistance information" that is to be received from a serving BS by a receiving MS. This category may include, for example, the following information:
1) SV signal PRN sequence identifier(s);
2) estimated relative position(s) of the SV(s) and MS ($\bar{r}_{BS\_MS}$), that may be described as: (a) a Distance between the SV and the MS's estimated location, and (b) an Azimuth and Elevation of the SV in a given coordinate system, as viewed from an estimated location of the MS;
3) SV clock bias ($b_{SV}$) value(s) (however, because this term is generally small compared to a minimum search window size equivalent to one Coarse Acquisition (C/A) chip, alternatively, it may be omitted, or it may be used as a correction term to the SV-to-MS distance after scaling with c); or
4) SV Doppler frequency information ($f_{SV}$), as viewed from the estimated MS location, including coefficients for first, second, or even higher order derivatives of an equation for the Doppler frequency, which may be included to enable the MS to extrapolate code phase and Doppler predictions into future time.

A second category of information elements that may be usefully incorporated into acquisition assistance request messages, if not present, is labeled "BS signal acquisition assistance information" that is to be received by the serving BS from the MS. This category of information may include, for example:
1) Pilot signal PN sequence identifier(s);
2) estimated relative position of the serving BS and the MS ($-\bar{r}_{BS\_MS}$), that may be described as: (a) a distance between the BS and the MS's estimated location, and (b) an azimuth of the BS in a given coordinate system, as viewed from the estimated location of the MS;
3) BS clock bias ($\hat{b}_s$); or
4) BS clock bias uncertainty ($\tilde{b}_{BS}$).

"MS location uncertainty" is a third category of useful information elements, describing an area around the estimated location of the MS. Elements of information in this category may be received from the BS or computed within the MS. These elements may include, for example:
1) three-dimensional (3-D) uncertainty ellipsoid, equivalent to 3-D covariance matrix; or
2) two-dimensional uncertainty ellipse together with vertical uncertainty value. These two elements would typically be used in the alternative, rather than concurrently.

"Estimated MS clock information" is a fourth category of useful information elements that may be usefully incorporated into acquisition assistance request messages, if not present, and may be received by the MS from the BS, or computed within the MS. This category of information may include, for example:
1) MS clock bias ($\hat{b}_{SV}$);
2) MS clock bias uncertainty ($\tilde{b}_{MS}$);
3) MS clock frequency offset ($\Delta \hat{f}_{MS}$);
4) MS clock frequency offset uncertainty ($\Delta \tilde{f}_{MS}$); or
5) Time of validity for the MS clock bias estimate ($T_0$), which may, for example, be either an explicit time value or a reference number, such as a measurement sequence number referring to a prior measurement reference time stored in the MS.

"MS calibration information" is a fifth category of useful information elements that may be incorporated into acquisition assistance request messages, if not present, to facilitate code phase and window calculations. These elements may be stored within the MS. This category of information may include, for example:
1) estimated time delay difference between the GPS and CDMA receive chain in the MS ($\hat{d}_{MS}$); or
2) uncertainty of the estimated time delay difference between the GPS and CDMA receive chain in the MS ($\tilde{d}_{MS}$).

One example of information messages and protocols that may be employed in conjunction with the method and apparatus set forth herein is described in detail in the attached Appendix A (entitled "General acquisition assistance message"). The attached General acquisition assistance message describes specific messages, formats, and protocols that are included in the CDMA standard IS-801-A, and shows changes to such messages, formats and protocols that are proposed in order to facilitate improved wireless assisted position determination, in accordance with the further teachings herein.

Acquisition Assistance Data Computation Methods for Ms

After receiving appropriate information such as set forth above, an MS may calculate code phase estimates and uncertainty windows according to the method set forth hereinbelow. The method uses the term "SV signal" for signals that are to be acquired or measured, because this is a common practice and is geometrically straightforward. However, any signal whose acquisition is sought may be treated as set forth for a "SV signal" of the set that is to be measured in the method below. All procedures for other signals that are to be measured, such as untracked BS signals, are substantially similar or identical to those referenced below, such that the skilled person will readily modify the calculations for such other signals without a need for explicit instructions herein. Accordingly, acquisition assistance (e.g., code phase estimates and windows) may readily be calculated for other signals, such as BS signals, that may then be more easily acquired. Such other signals may serve many of the same purposes as SV signals, for example for ranging and location determination, and indeed may entirely supplant SV signals if necessary.

The following is an exemplary algorithm of steps that may be taken by an MS to obtain and update acquisition assistance data needed to acquire a set of (typically SV) signals. The algorithm primarily involves time-sensitive data—time insensitive parameters are also needed for signal acquisition, such as the PN code and signal frequency, but these parameters are generally not addressed by this algorithm. The assistance that is ultimately needed for acquiring a particular signal includes a code phase (or time of arrival) estimate, and an uncertainty window size around that estimate, along with a Doppler frequency estimate and uncertainty window, for the particular signal. The following algorithm generally indicates steps that are taken by the MS, although the steps could alternatively be performed by other entities. The MS typically calculates the "ultimate" acquisition assistance data (code phase, Doppler and corresponding uncertainty windows). Such calculation is performed on the basis of acquisition assistance data parameters received from a remote entity (such as a PDE), as well as upon acquisition assistance data parameters that may have been previously obtained by computation within the MS, and in some cases based further upon measurements made by the MS. The MS may also calculate intermediate parameters, and may recalculate them to reflect changes, for example in time or in position. Details of the "obtain and update acquisition assistance" algorithm are set forth below:

1. Evaluate availability and validity for existing acquisition assistance data, and calculate the assistance data for a set of SV signals to be measured as follows:
   a. If MS clock information is available, calculate the MS clock frequency in accordance with available correction terms as possible:
      i. If MS clock frequency correction information is available, correct the estimated clock bias $\hat{b}_{MS}$ (of time $T_0$) by adding the following value, $\Delta \hat{f}_{MS} \cdot (t-T_0)$, to the clock bias, where the SV measurements will be taken at time t.
      ii. If MS clock bias uncertainty correction information is available, correct the clock bias uncertainty $\tilde{b}_{MS}$ (of time $T_0$) by adding $\Delta \tilde{f}_{MS} \cdot (t-T_0)$.
      iii. If corrections according to steps i. or ii. cannot be performed, use the uncorrected value of the relevant quantity.
   b. Select a SV from the set of SVs whose signals are to be measured for first signal acquisition, beginning with high elevation angle SVs if that is convenient.
   c. Use Equations (4) and (5) to compute the predicted code phase and search window size for at least a first of the set of SV signals to be measured.
   d. Use Equations (1) and (2) to compute the predicted Doppler and Doppler search window size for at least a first of the set of SV signals to be measured.
   e. If MS clock information is not available or it is not valid for the current measurement, and the MS uses the CDMA time reference for the MS measurements:
      i. Use Equations (7) and (8) to compute the predicted code phase and search window size for at least a first of the set of SV signals to be measured.
      ii. Use Equations (1) and (2) to compute the predicted Doppler and the Doppler search window size for at least a first of the set of SV signals to be measured.
2. Based on the assistance data calculated as described in Step 1 of this algorithm, measure at least one of the SV signals to obtain a measured code phase value.
3. Using measurement results from one or more signals from the set of SV signals that were to be measured in accordance with any appropriate navigation algorithms:
   a. recompute some or all of the MS parameters R, $\hat{b}_{MS}$, $\tilde{b}_{MS}$, $\Delta \hat{f}_{MS}$, and $\Delta \tilde{f}_{MS}$;
   b. optionally, recompute other parameters as needed, such as $\bar{r}_{BS\_MS}$, $\bar{r}_{BS\_SV}$, and $\bar{r}_{MS\_SV}$,
   c. optionally, compute α and azimuth for one or more unmeasured SV signals remaining from the set of SV signals to be measured.
4. Determine if all of the set of SV signals to be measured have been acquired or measured.

If all have been measured, STOP acquisition measurements and proceed to desired subsequent steps, such as computing MS location.

If SV signals remain to be measured, then modify the set of SV signals that is to be measured to reflect only those not already measured, and return to Step 1 as described above.

Examples of appropriate navigation algorithms may be found in U.S. Pat. No. 6,353,412.

The following is an example illustrating Step 3 of the method described above, assuming that an MS clock bias estimate is known. A code phase P for a SV signal has been measured, and the MS may be determined to be enclosed in a space V between two spheres co-centered on the SV location. The sphere radii are given by the following equation:

$$c[(P+b_{MS}+b_{SV})+/-(|\tilde{b}_{MS}|+|P \text{ uncertainty}|)],$$

The MS location may be updated because it is limited to an intersection of the space V and the most valid previously estimated MS location uncertainty area. If the intersection is smaller than the previously estimated MS location uncertainty area, then it may be possible to reduce MS clock bias uncertainty (after allowing for measurement uncertainty of P). As an example of reducing MS clock bias uncertainty, consider the case in which the SV is at α=90° elevation angle. In this case, V is approximately defined by two parallel horizontal planes. The MS clock bias uncertainty can therefore be reduced to a level that is equivalent to the uncertainty in altitude location, allowing for measurement uncertainty.

The following example illustrates a second implementation of Step 3 of the present method. This implementation should be used when an estimate of the MS clock bias is not available, and when it is known that the MS derives its time reference from a serving BS pilot signal. The MS is located in a space V between the surfaces of two hyperboloids, each having one focal point at the SV and the other focal point at the serving BS. The characteristic distance differences of the two hyperboloids are based upon the measured code phase corrected by $f_c \cdot (\hat{b}_{BS}+\hat{d}_{MS})$ (multiplied by c), where $\hat{b}_{BS}$ is the estimated BS clock bias and $\hat{d}_{MS}$ is the estimated time delay difference between the GPS and CDMA receive chains in the MS. The two hyperboloids are separated by a distance reflecting uncertainties in the measured code phase, and in $\hat{b}_{BS}$ and $\hat{d}_{MS}$. The updated MS location is given by the intersection of V and the previously estimated MS location uncertainty area. If the intersection is smaller than the previously estimated MS location uncertainty area, the location uncertainty may be reduced.

Note that the second implementation of Step 3 set forth above may be modified for use with any secondary signal source tracked by the MS (so that the code phase measurement to such source is available at the MS), in place of the serving BS. To do so, the P measured for the SV may be recalculated from a reference time that the MS would use if such a secondary source provided the time reference, i.e. the measurements may be offset by the relative arrival time of the secondary source signal. Using corresponding information relative to such a secondary source, the calculation otherwise proceeds as described above with respect to a serving BS.

Extending Acquisition Assistance Data Validity—Time Considerations

Validity duration of the acquisition assistance data may be defined as the length of the time period during which the assistance data can accurately describe the distance of the BSs and SVs from the MS. The validity duration depends on the degree of movements of the SVs and the MS, assuming that the BSs can be considered stationary. For a stationary MS, the validity duration of the SV acquisition assistance data ranges from 30 seconds to one hour, depending on the availability and precision of coefficients that are provided for higher order terms in an equation describing SV Doppler shifts.

It is beneficial to utilize the (possibly substantial) validity time of assistance data, both to reduce the time needed to acquire a signal, and to preserve communication resources by reducing the need for frequent assistance data updates. Effective utilization of the assistance data, however, is impeded by present system features related to MS clock synchronization and MS location.

First, for example, an MS often changes its time reference due to base station handoffs (or other changes in the serving BS) which may result from signal fading, traffic conditions, or other causes. When a change in the pilot signal used as a time reference occurs, the observed code phase of the signal (from a SV or a BS) whose acquisition is sought may be offset by such a large value that the original code phase assistance becomes useless. In such a case, the MS may update the $\bar{r}_{BS\_Ms}$ value to be referenced to the new serving BS, in order to compute the appropriate assistance data.

Extending Acquisition Assistance Data Validity—Movement Considerations

A second impediment to effective utilization of assistance data arises from the fact that an MS that is not stationary may be displaced by a distance that is sufficient to invalidate previous code phase assistance data. If the MS has moved since the reception of the acquisition assistance data, and the MS can obtain an estimate of its new location, then the MS may simply use the new location estimate for calculating the acquisition assistance data, based on other acquisition assistance information that was previously received (assuming it is still valid). The MS may obtain a new location estimate by any available convenient means. For example, the MS may carry out Advanced Forward Link Trilateration (AFLT) measurements in order to derive a relatively narrow position estimate. An estimate of location may be established based upon the serving sector of a new serving BS alone. A serving sector estimate may be further limited by means of partial measurements, such as a code phase to a second BS that is tracked by the mobile station. Such a partial measurement may define an uncertainty area limited to an intersection of the serving sector and an uncertainty area around a hyperboloid defined by foci at the serving BS and (for example) a second BS. In this example, the hyperboloid has a characteristic distance determined by the relative code phase of the second BS with respect to the serving BS. The uncertainty value, or range on either side of the nominal hyperboloid, includes a sum of clock uncertainties for the two BSs, and a sum of uncertainties of measurements of the code phase to each (multiplied by c). By updating MS location information as needed, the valid life of much acquisition assistance data may be extended up to time limits imposed by the ability to extrapolate into the future, which, as described above, is limited by the accuracy and availability of coefficients for higher orders of the equation describing Doppler shifts of a signal source (SV).

Another technique that may be used for determining whether the MS has moved is "BS list comparison." BSs are selected for membership in a list according to criteria that are particular to the list. As conditions change, these particular criteria will identify a different set of BSs, which will constitute the membership of the updated list. Accordingly, the "same list," as that term is used herein, will refer to a list arrived at by consistent criteria and procedures, and the membership of such list will be expected to change over time to reflect changing conditions.

A BS list may be appropriate for determining MS movement if the criteria for membership in the list significantly reflect MS location. Examples of appropriate lists for this purpose include a "Neighbor List," an "Active Set," or a serving BS. Other lists may, of course, be appropriate, particularly in non-CDMA implementations, which may not use these particular lists at all. A "serving" BS is the BS in primary communication with an MS being served. A "Neighbor List" is provided by a serving BS to a served MS, and identifies BSs that are relatively nearby, but generally does not include BSs that are in the "Active Set" of the MS. An "Active Set" is a list or group of (typically 1-6) BSs having strong pilot signals that are actively tracked by an MS.

The BS list comparison technique may be used to determine whether to recalculate MS location and to compensate acquisition assistance data for the new location. Alternatively, this technique can be used merely as an indicator of whether previous acquisition assistance data (or other data) is, or is not, still valid, based on the current MS position. For some purposes, this technique does not require an MS to obtain any information that is not ordinarily made available to the MS in accordance with existing wireless communication standards, and thus, the technique may be implemented without regard to changes in requirements set forth in such standards. Moreover, a determination as to whether an MS has been moved may be useful not only in deciding whether acquisition information remains valid, but also in regard to other location-sensitive issues. For example, a determination of substantial MS movement may be used in some circumstances to trigger a new position location session. A determination of MS movement may also trigger an update of location-sensitive data, such as a BS almanac, a repeater almanac, etc.

Possible movement of an MS may be presumed any time there is a change in any item between past and present versions of (a) a Neighbor List of BSs for the MS, (b) an Active Set of BSs for the MS, or (c) a serving BS for the MS. Thus, in the absence of any changes, it may be presumed that no movement occurred. This result may, for example, avoid a need to update MS location estimates, and may indicate that previously obtained acquisition information (or other MS position-sensitive information) remains valid. If some part of this combination of comparisons changes, then, in the simplest case, the data whose validity is at issue may be assumed invalid. However, a more detailed analysis may be needed to determine, without excessive conclusions of invalidity, whether sufficient MS movement has actually occurred that would jeopardize the accuracy, and hence the validity, of existing location-sensitive information.

A more detailed analysis as to whether the MS has moved significantly may be triggered, for example, by any small change in a relevant BS list. An analysis may be simple, or it may be complex, with the appropriate complexity depending upon the purposes for which movement is being detected. For example, if the purpose of detecting movement is merely to determine whether to update a list of local repeaters, or SVs, then the analysis may be as simple as merely testing whether a serving BS has changed, and the Active Set has also changed. However, for E911 emergency location purposes, a highly sensitive analysis may be desired. The sensitivity and complexity of the analysis will be selected in accordance with ordinary engineering considerations, for example balancing processing effort versus speed to acquisition.

Figure 2:
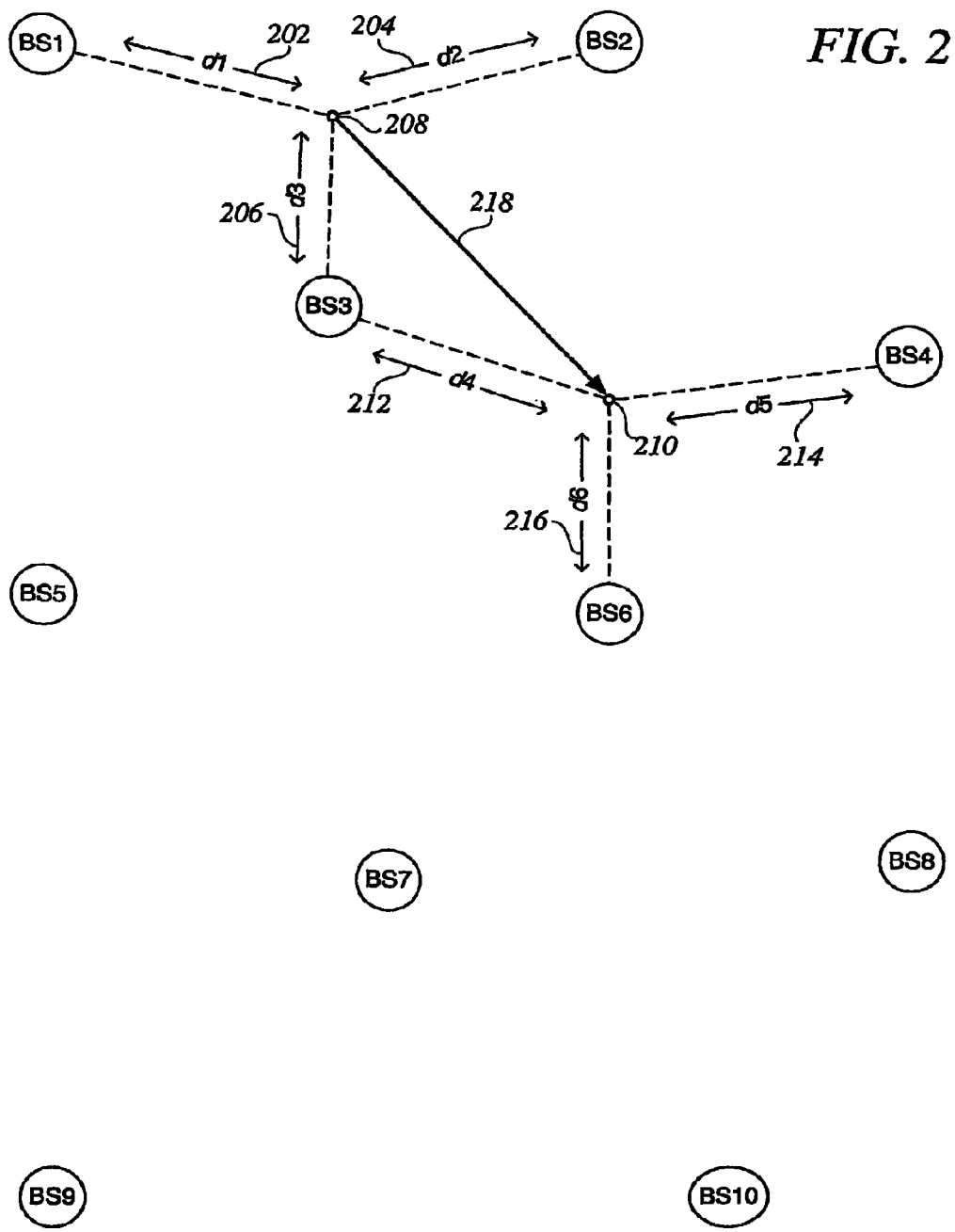
FIG. 2 illustrates a plurality of base stations and is used in describing how base station lists within a mobile station can be used to draw a conclusion that the mobile station has moved locations.

Consider a plurality of BSs disposed about a region as shown in FIG. 2. For purposes of this discussion, it may be assumed that the distance between BS1 and BS10 is approximately five miles. Assume further that a particular MS initially has an Active Set of BSs composed of BS2, BS3 and BS4, and that the serving BS is BS3. BS4 and BS6 are relatively close together, and an MS may well be in such a position that either BS is equally suited for inclusion in the Active Set of the MS. Accordingly, if BS4 is dropped from the Active Set while BS6 is added, the proximity of the omitted and added BSs may mean that a conclusion of MS movement cannot reliably be drawn from this change alone. Therefore, minor changes such as omitting BS4 and adding BS6 to an Active Set might be treated as failing to indicate a significant MS location change. However, even such minor changes to a list may be used to trigger an examination of one or more additional indicators for corroboration of the weak evidence of MS movement that the minor change represents. Such corroboration may be obtained, for example, from examination of other lists, or of ranging signal data.

The minor change of BS6 replacing BS4 in the MS Active Set may be interpreted (by itself) as not indicating substantial movement. Given the same initial Active Set (BS2, BS3 and BS4), however, a change to BS3, BS5 and BS7 suggests that significant MS movement has occurred, even if the serving BS remains the same (BS3). Accordingly, after such a change in the Active Set, location information and acquisition assistance may be assumed to be invalid if it indicates a location uncertainty that is narrower than the cell of the serving BS. (Of course, if the serving BS remains the same, then very coarse information indicating location within the serving cell boundaries may remain valid). If the information appears to be invalid, then a need for acquisition assistance at the MS would warrant a request for new acquisition assistance from the serving BS.

Neighbor lists may be used in a manner similar to the use of Active Sets set forth above. For example, an original Neighbor List that includes BS1, BS2 and BS5 (with BS3, BS4 and BS6 in the Active Set), and which changes to omit BS5 and add BS7, may not indicate substantial MS movement, particularly if BS6 remains the serving BS. However, if the Neighbor List changes instead to omit BS1 and BS2, while adding BS7 and BS8 (thus including only BS5, BS7 and BS8), while the Active Set continues to include BS3, BS4 and BS6, then MS movement may be inferred even if BS6 remains the serving BS.

A decision as to whether or not particular changes (in a combination of any or all of the server BS, Active Set and Neighbor List) should be taken to imply substantial movement may be quantified. Any appropriate technique may be used, and indeed different techniques may be used for different purposes (e.g., with respect to different data) or with respect to different sets of BSs (e.g., all visible BSs, Active Set BSs, or serving BSs).

One technique that may be employed to quantify a decision as to whether "significant" or "data validity jeopardizing" MS movement has occurred is to determine an "apparent change" vector between a first point, representing a list of BSs at an earlier time, and a second point that represents the same list of BSs at a later time. A point may be considered to represent a particular list of BSs if it is located such that a sum of the squares of its distance to each of the BSs on the list is minimized. A vector from the first point to the second point may be called an "apparent change" vector. An "apparent change" vector may be calculated for any relevant set of BSs (e.g., Neighbor List, Active Set, combined list, etc.) Each "apparent change" vector may be considered independently, or alternatively vectors produced from different lists may be vectorially combined (other combinations are, of course, also possible). The resulting vector may be compared (individually, or after combination) to an appropriately selected threshold value. A result exceeding the selected threshold may be interpreted as indicating substantial, data-jeopardizing movement of the MS, while differences below such a threshold may be interpreted to be inconsequential.

A simple example of calculating an "apparent change" is illustrated with reference again to FIG. 2. At time $T_0$, a first set of BSs (an Active Set) consists of BS1, BS2 and BS3. At a later time t the Active Set consists of BS3, BS4 and BS6. By minimizing Sum1=$(d_1\ 202)^2+(d_2\ 204)^2+(d_3\ 206)^2$, a first point 208 is located. A second point 210 is located by minimizing Sum2=$(d_4\ 202)^2+(d_5\ 204)^2+(d_6\ 206)^2$. The "apparent change" vector 218 exists between the first point 208 and the second point 210. Note that if BS sets such as the Active Set and a Neighbor List are mutually exclusive, then when two particular BSs swap places in the two different sets, the "apparent change" vector of one set will tend to cancel the "apparent change" vector of the other set to some degree. Weighting may be added as a refinement. The appropriate threshold will depend upon whether BS group results are combined. A starting threshold may be set at ⅙ of a sum of the previous and current location uncertainty. An alternative threshold may be calculated as 45% of an average distance between BSs.

Thus, a method of evaluating MS movement based upon a comparison of some combination of present and previous server BSs, Neighbor List BSs, and Active Set BSs may be developed. The method may be as simple or as intricate as desired, depending upon engineering considerations and other factors. Such considerations may include the availability of BS location information, the methods by which Neighbor Lists and Active Sets are selected, and the location sensitivity of the issue for which such evaluation is undertaken.

For purposes of evaluating whether a selected MS has moved, changes to groups of BSs may be examined as set forth above. However, the groups may vary widely, and need not be restricted to BSs but may include any useful signal sources. A group will likely be relevant if criteria for inclusion in the group (or list) are predominantly based upon proximity to an MS. The value and significance of changes in the membership of various groups will depend upon unique characteristics of such a group, and results from different groups may need to be weighted before combining with the results of other groups. The name of any group is of no concern, and the particular names Active Set, Neighbor List and Serving BS are used herein only because they provide convenient reference to groups known in CDMA systems that are relevant to MS location determination. In other systems, different groups may be relevant even if the criteria for inclusion is significantly different from the criteria for these specific BS groups. Distinctions between the relevance and significance of the membership in various groups must be considered on a case-by-case basis, and weighting may need to be imposed when combining MS movement indications derived from changes to groups of differing significance or sensitivity.

Figure 3:
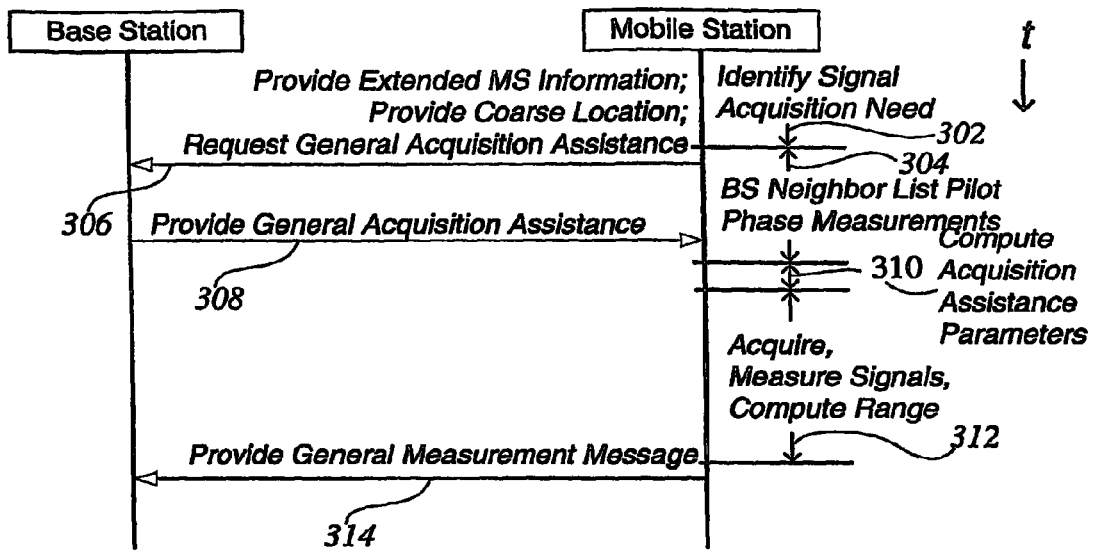
FIG. 3 illustrates message flow for a position location session initiated by a mobile station.

Call Flow for Acquisition Assistance Messages in CDMA Telecommunications Systems FIG. 3 illustrates message flow when an MS initiates a position location session, or otherwise identifies a need for acquisition assistance. Such need may arise, for example, when a user requests location information from an MS. In FIG. 3 the MS identifies a need for acquisition assistance information during a time 302. During a subsequent time 304, the MS will begin several activities, which need not be sequential. A message 306 will be prepared and transmitted to the serving BS, there to be communicated to a Position Determining Entity (PDE) within the system. The message 306 may provide information to the serving BS about the capabilities of the MS to interpret advanced location information, and to calculate location information parameters locally, and information about the acquisition assistance parameters that are needed. The message 306 may also provide such information about the location of the MS, already available to the MS (however coarse that information may be), such as, for example, the identification of the serving BS, a list of Active Set BSs and corresponding pilot measurements, a Neighbor List, LAT/LONG from CDMA overhead message, etc. Any or all information that will aid the PDE may be transmitted, including information about the serving BS, which may not be in data communication with the PDE. A message requesting acquisition assistance will also be transmitted to the PDE via the BS, such as the message entitled "Provide General Acquisition Assistance."

In addition to preparing and transmitting the acquisition assistance request message 306, during the time period 304, the MS may also begin acquiring information about BS signals that may be useful. This may include acquiring BS signals that the MS has not been tracking, and measuring BS signals that may provide useful ranging information. During this time, the MS may also endeavor to improve the location information that it has, such as by means of advanced forward link trilateration (AFLT) using the BS measurements that it has made in addition to almanac information available about such BSs. Note that it may be useful to determine whether any BS pilot signals appear to have arrived via a repeater, so that such signal may be appropriately processed and not treated as having been transmitted directly from the serving BS. If these tasks are completed before acquisition assistance information is forthcoming from the PDE via the BS, the MS may attempt to acquire any signals that it needs, in advance of receiving such acquisition assistance information.

After the PDE transmits the acquisition assistance information signal 308 to the MS via the BS, during a time 310, the MS computes acquisition assistance parameters in accordance with the acquisition assistance information provided from the PDE, as well as in accordance with the measurements of local BS code phases. Various techniques for such computations are set forth above.

During a time 312 after the MS has computed acquisition assistance information for at least a first signal to be acquired, the MS employs the resulting estimated code phase and window, and the characteristics of the signal, to actually acquire the signal. It may be advantageous to begin with a SV that is nearly overhead, in order to be able to reduce MS clock bias uncertainty, and thereafter to reduce a computed acquisition window for subsequent signals in accordance with a sequential "tightening" of the code phase uncertainties based upon measurement of only part of a list of desired signals. During this time the MS will generally complete acquiring the ranging signals as required. If it is within the purview of the MS, the MS may also compute its location, or otherwise interpret the raw ranging information that it measures. After completing these tasks, the MS transmits a message 314 back to the appropriate entity or entities. The message 314 will generally contain the results of the ranging signal measurements and location, if these are determined The message may be a standard message entitled "Provide General Measurement Message."

Figure 4:
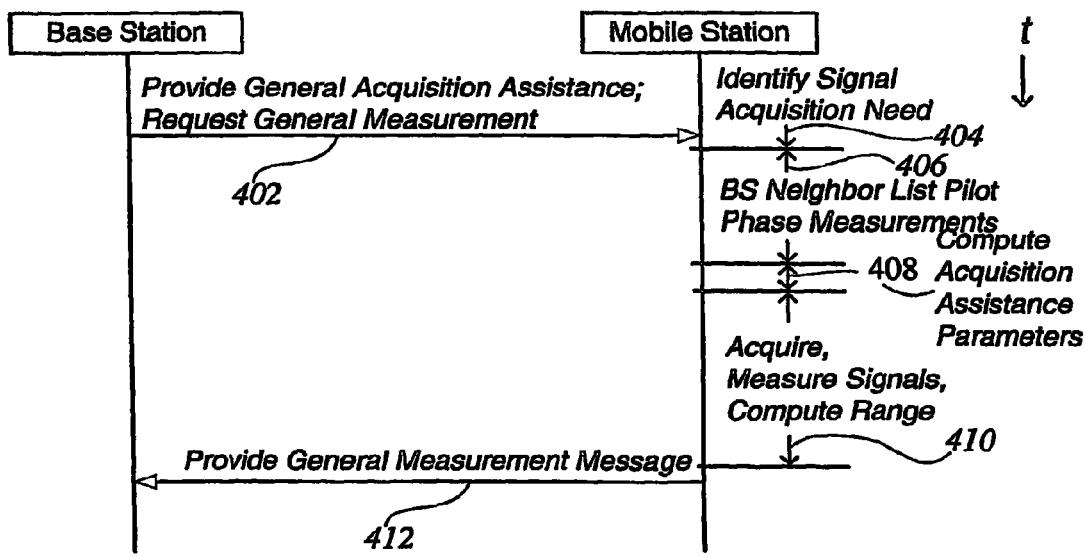
FIG. 4 illustrates message flow for a position location session terminated by a mobile station.

FIG. 4 illustrates message flow when another entity initiates the position location session, or otherwise directs the MS to seek signals for which acquisition assistance is needed. In such a case, the MS does not initiate activities to further such position determination until it is apprised of the need by a message 402. The message 402 may provide general acquisition assistance, in which the BS or PDE uses information that it has, such as the location of the serving cell for the MS, to determine initial acquisition assistance data and initial location information. The message will typically include a request for a general measurement, and may contain further information such as a list of signals to be used for position determination, and so on. Thus, the MS determines a need to acquire signals at a time 404 after receiving the message 402.

After receiving the message 402, the MS may proceed similarly as described above with respect to FIG. 3. Acquisition of relevant BSs, such as those of a Neighbor List, may be undertaken during the time period 406, although this time period may be shortened compared to the corresponding time period 304 of FIG. 3 due to further information that is provided to the MS along with the initial request in message 402.

The MS may proceed to compute acquisition parameters during a time period 408, after measuring useful BSs. These activities may in fact overlap between the indicated periods. During a time period 410 the MS may use the acquisition assistance obtained from computation in period 408, or from the request message 402, and additionally from measurements made at the MS, to actually acquire and measure the signals of interest. After acquisition is complete, the MS may simply return the measurement data to the requesting entity via the BS in a message 412. If desired, the MS may compute actual ranging and location values to be included in the message 412.

Additional Messages in Telecommunications Systems

In accordance with one embodiment of the disclosed method and apparatus, the MS receives a "Send All Measurements" (SAM) flag within one of the messages transmitted to the MS from the BS. The SAM flag indicates that the MS should provide measurements for all of the communication signals for which the MS has measured the relative time of arrival (or alternatively, the actual time of arrival in cases in which the MS is capable of measuring the time of arrival in actual time). It should be noted that under conventional circumstances, the MS will select measurements of particular signals received by the MS from among all of the possible measurements that the MS might be capable of making.

The reason for limiting the number of measurements sent in a conventional system is that it is assumed that only the earliest arriving signal from each BS will be provide value to the device tasked with calculating the location of the MS. This is because later arriving signals transmitted to the MS from the same BS as an earlier arriving signal received by the MS are assumed to be reflections (also commonly referrer to as "multipath signals"). Such multipath signals have taken an indirect path from the BS to the MS. As can be understood by noting that the fastest route between the BS and the MS is the most direct route, the earlier arriving signal will have traveled the most direct route. The distance along the most direct route is most accurate indication of the distance between the BS and the MS. Accordingly, measurements of other less direct routes between the BS and the MS are assumed to be of little value. In addition, in some cases, the power of the received signals must be above a desired power threshold or the MS will not report the measurement of that signal, even if that signal is the earliest arriving signal from among the signals received from the same source.

However, signals that are either below the power threshold or that have traversed an indirect route can provide additional information to the device that will ultimately calculate the location of the MS. Accordingly, the presently disclosed method and apparatus allows the BS to transmit the SAM flag and allows for the MS to respond to the message that includes the SAM flag by sending all of the measurements that the MS is capable of making. Alternatively, upon receiving the SAM flag, the MS sends a subset of all possible measurements, the subset being greater than the subset of measurements that would otherwise be sent if the SAM flag were not received by the MS.

Conclusion

The foregoing description illustrates exemplary implementations, and novel features, of a method and system for obtaining acquisition assistance information for use in wireless communications. There are many aspects to this method and system, because it may involve interaction between numerous components of a communications system. Different aspects of the method and system may involve, for example, obtaining original acquisition assistance data, extending the life of such data, obtaining some acquisition data by calculation using previously obtained acquisition assistance data, or by updating previous acquisition information to reflect changes in circumstances, and evaluating a validity of previously obtained acquisition assistance data. While some suggestions are provided for alternative uses and implementations of the method and apparatus, it is of course not practical to exhaustively list or describe such alternatives. Accordingly, the scope of the presented invention should be determined only by reference to the appended claims, and should not otherwise be limited by features illustrated herein except insofar as such limitation is recited in an appended claim.

While the above description has pointed out novel features of the disclosed method and apparatus as applied to various embodiments, the skilled person will understand that various omissions, substitutions, and changes in the form and details of the methods and systems illustrated may be made without departing from the scope of the invention. For example, the skilled person will be able to adapt the details described herein to communications systems having a wide range of modulation techniques, transmitter and receiver architectures, and generally any number of different formats. In particular, any system transmitter may function as a base station for purposes of this disclosure, and need not utilize CDMA technology, nor even be a cellular telecommunications base station. Any transmitter may be treated similarly as SVs are treated herein, with acquisition assistance information deduced, obtained and employed to aid in the acquisition of a signal from such transmitter.

Each practical and novel combination of the elements described hereinabove, and each practical combination of equivalents to such elements, is contemplated as an embodiment of the invention. Partly because many more element combinations are contemplated as embodiments of the invention than can reasonably be explicitly enumerated herein, the scope of the invention is properly defined by the appended claims rather than by the foregoing description. Furthermore, any operable possible combination of features described above should be considered as having been expressly and explicitly disclosed herein. All variations coming within the meaning and range of equivalency of the various claim elements are embraced within the scope of the corresponding claim. To this end, each described element in each claim should be construed as broadly as possible, and moreover should be understood to encompass any equivalent to such element insofar as possible without also encompassing the prior art.

What is claimed is:

1. A method of acquiring a signal at a telecommunications system receiver, the method comprising:
   obtaining acquisition assistance data;
   acquiring a first signal at the receiver using the obtained acquisition assistance data;
   using a location of the receiver obtained using the first signal to make a validity determination of whether the obtained acquisition assistance data are valid;
   calculating, based on the obtained acquisition assistance data and the location of the receiver, and in response to the validity determination indicating that the obtained acquisition assistance data are not valid, updated acquisition assistance data to acquire a second signal; and
   setting a code phase window size responsive to the updated acquisition assistance data.

2. The method of claim 1 wherein the receiver is a mobile station in a telecommunications system, and wherein calculating the updated assistance data comprises calculating one or more of: predicted time of arrival (TOA) for the second signal, predicted TOA uncertainty window size of a window around the predicted TOA for the second signal, predicted Doppler frequency for the second signal, and Doppler predicted uncertainty window size of a Doppler frequency window around the predicted Doppler frequency for the second signal.

3. The method of claim 1, wherein the calculating comprises:
   recomputing the acquisition assistance data based on measurement results for the acquired first signal; and
   calculating, based on the recomputed acquisition assistance data, the updated assistance data to acquire the second signal.

4. The method of claim 1, further comprising compensating an estimated time of arrival, based on the obtained acquisition assistance data, for movement of the receiver subsequent to obtaining the obtained acquisition assistance data.

5. The method of claim 1, further comprising compensating a calculated time of arrival uncertainty window, based on the obtained acquisition assistance data, for movement of the receiver subsequent to obtaining the obtained acquisition assistance data.

6. The method of claim 1 wherein at least some of the obtained acquisition assistance data are obtained from a remote entity prior to acquiring the first signal.

7. The method of claim 1 further comprising determining that the receiver has moved based upon a combination of comparisons selected from (a) a present neighbor list of the receiver to a previous neighbor list of the receiver, (b) a present active base station list of the receiver to a previous active base station list of the receiver, and (c) a present serving base station for the receiver to a previous serving base station for the receiver.

8. A telecommunications system receiver comprising:
   obtaining means for obtaining acquisition assistance data;
   acquiring means for acquiring a first signal at the receiver using the obtained acquisition assistance data;
   means for using a location of the receiver obtained using the first signal to make a validity determination of whether the obtained acquisition assistance data are valid;
   calculating means for calculating, based on the obtained acquisition assistance data and the location of the receiver, and in response to the validity determination indicating that the obtained acquisition assistance data are not valid, updated acquisition assistance data to acquire a second signal; and
   means for setting a code phase window size responsive to the updated acquisition assistance data.

9. The receiver of claim 8 wherein the receiver is a mobile station in a telecommunications system, and wherein the means for calculating the updated assistance data comprises means for calculating-one or more of: predicted time of arrival (TOA) for the second signal, predicted TOA uncertainty window size of a window around the predicted TOA for the second signal, predicted Doppler frequency for the second signal, and Doppler predicted uncertainty window size of a Doppler frequency window around the predicted Doppler frequency for the second signal.

10. The receiver of claim 8, further comprising first means for compensating an estimated time of arrival, based on the obtained acquisition assistance data, for movement of the receiver subsequent to obtaining the obtained acquisition assistance data.

11. The receiver of claim 8, further comprising second means for compensating a calculated time of arrival uncertainty window, based on the obtained acquisition assistance data, for movement of the receiver subsequent to obtaining the obtained acquisition assistance data.

12. The receiver of claim 8 wherein the obtaining means are configured to obtain at least some of the obtained acquisition assistance data from a remote entity prior to acquiring the first signal.

13. The receiver of claim 8 further comprising means for determining that the receiver has moved based upon a combination of comparisons selected from (a) a present neighbor list of the receiver to a previous neighbor list of the receiver, (b) a present active base station list of the receiver to a previous active base station list of the receiver, and (c) a present serving base station for the receiver to a previous serving base station for the receiver.

14. The receiver of claim 8, wherein the computing means configured for calculating, based on the measurements results for the acquired first signal at the receiver, the updated assistance data to acquire the second signal are configured for:
recomputing the acquisition assistance data based on the measurements results for the acquired first signal at the receiver; and
calculating, based on the recomputed acquisition assistance data, the updated assistance data to acquire the second signal.

15. A computer program product, for acquiring signals at a telecommunications system receiver, residing on a non-transitory processor-readable medium comprising instructions configured to cause a processor to:
obtain acquisition assistance data;
acquire a first signal at the receiver using the obtained acquisition assistance data;
make a validity determination, using a location of the receiver obtained using the first signal, of whether the obtained acquisition assistance data are valid;
calculate, based on the obtained acquisition assistance data and the location of the receiver, and in response to the validity determination indicating that the obtained acquisition assistance data are not valid, updated acquisition assistance data to acquire a second signal; and
set a code phase window size responsive to the updated acquisition assistance data.

16. The computer program product of claim 15, wherein the instructions to cause the processor to calculate the updated assistance data comprise instructions to cause the processor to calculate, based on the measurement results, one or more of: predicted time of arrival (TOA) for the second signal, predicted TOA uncertainty window size of a window around the predicted TOA for the second signal, predicted Doppler frequency for the second signal, and Doppler predicted uncertainty window size of a Doppler frequency window around the predicted Doppler frequency for the second signal.

17. The computer program product of claim 15, further comprising instructions configured to cause the processor to compensate an estimated time of arrival, based on the obtained acquisition assistance data, for movement of the receiver subsequent to the obtained acquisition assistance data being obtained.

18. The computer program product of claim 15, further comprising instructions configured to cause the processor to compensate a calculated time of arrival uncertainty window, based on the obtained acquisition assistance data, for movement of the receiver subsequent to the obtained acquisition assistance data being obtained.

19. The computer program product of claim 15 further comprising instructions configured to cause the processor to determine that the receiver has moved based upon a combination of comparisons selected from (a) a present neighbor list of the receiver to a previous neighbor list of the receiver, (b) a present active base station list of the receiver to a previous active base station list of the receiver, and (c) a present serving base station for the receiver to a previous serving base station for the receiver.

20. The computer program product of claim 15, wherein the computer instructions configured to cause the processor to calculate comprise computer instructions configured to cause the processor to:
recompute the acquisition assistance data based on measurement results for the acquired first signal; and
calculate, based on the recomputed acquisition assistance data, the updated assistance data to acquire the second signal.

21. A wireless communication apparatus comprising:
a memory to store computer instructions; and
a processor-based device configured to cause, when executing the computer instructions stored in the memory, operations comprising:
obtaining acquisition assistance data;
acquiring a first signal using the obtained acquisition assistance data;
using a location of the apparatus obtained using the first signal to make a validity determination of whether the obtained acquisition assistance data are valid;
calculating, based on the obtained acquisition assistance data and the location of the apparatus, and responsive to the validity determination indicating that the obtained acquisition assistance data are not valid, updated acquisition assistance data to acquire a second signal; and
setting a code phase window size responsive to the updated acquisition assistance data.

22. The apparatus of claim 21, wherein the apparatus is a mobile station in a telecommunications system, and wherein calculating the updated assistance data comprises calculating, based on the measurement results, one or more of: predicted time of arrival (TOA) for the second signal, predicted TOA uncertainty window size of a window around the predicted TOA for the second signal, predicted Doppler frequency for the second signal, and Doppler predicted uncertainty window size of a Doppler frequency window around the predicted Doppler frequency for the second signal.

23. The apparatus of claim 21, wherein the processor-based device is further configured to cause the operations of:
compensating an estimated time of arrival, based on the obtained acquisition assistance data, for movement of the apparatus subsequent to obtaining the obtained acquisition assistance data.

24. The apparatus of claim 21, wherein the processor-based device is further configured to cause the operations of:

compensating a calculated time of arrival uncertainty window, based on the obtained acquisition assistance data, for movement of the receiver subsequent to obtaining the obtained acquisition assistance data.

25. The apparatus claim 21, wherein the processor-based device is configured to obtain at least some of the obtained acquisition assistance data from a remote entity prior to acquiring the first signal.

26. The apparatus of claim 21, wherein the processor-based device is further configured to cause the operations of:
   determining that the receiver has moved based upon a combination of comparisons selected from (a) a present neighbor list of the receiver to a previous neighbor list of the receiver, (b) a present active base station list of the receiver to a previous active base station list of the receiver, and (c) a present serving base station for the receiver to a previous serving base station for the receiver.

27. The apparatus of claim 21, wherein the processor-based device is configured to cause the operations of:
   recomputing the acquisition assistance data based on measurement results for the acquired first signal at the apparatus; and
   calculating, based on the recomputed acquisition assistance data, the updated assistance data to acquire the second signal.

* * * * *